No. 616,309. Patented Dec. 20, 1898.
J. T. GEDDIS.
HOG TRAP.
Application filed Mar. 25, 1897.
(No Model.) 2 Sheets—Sheet 1.
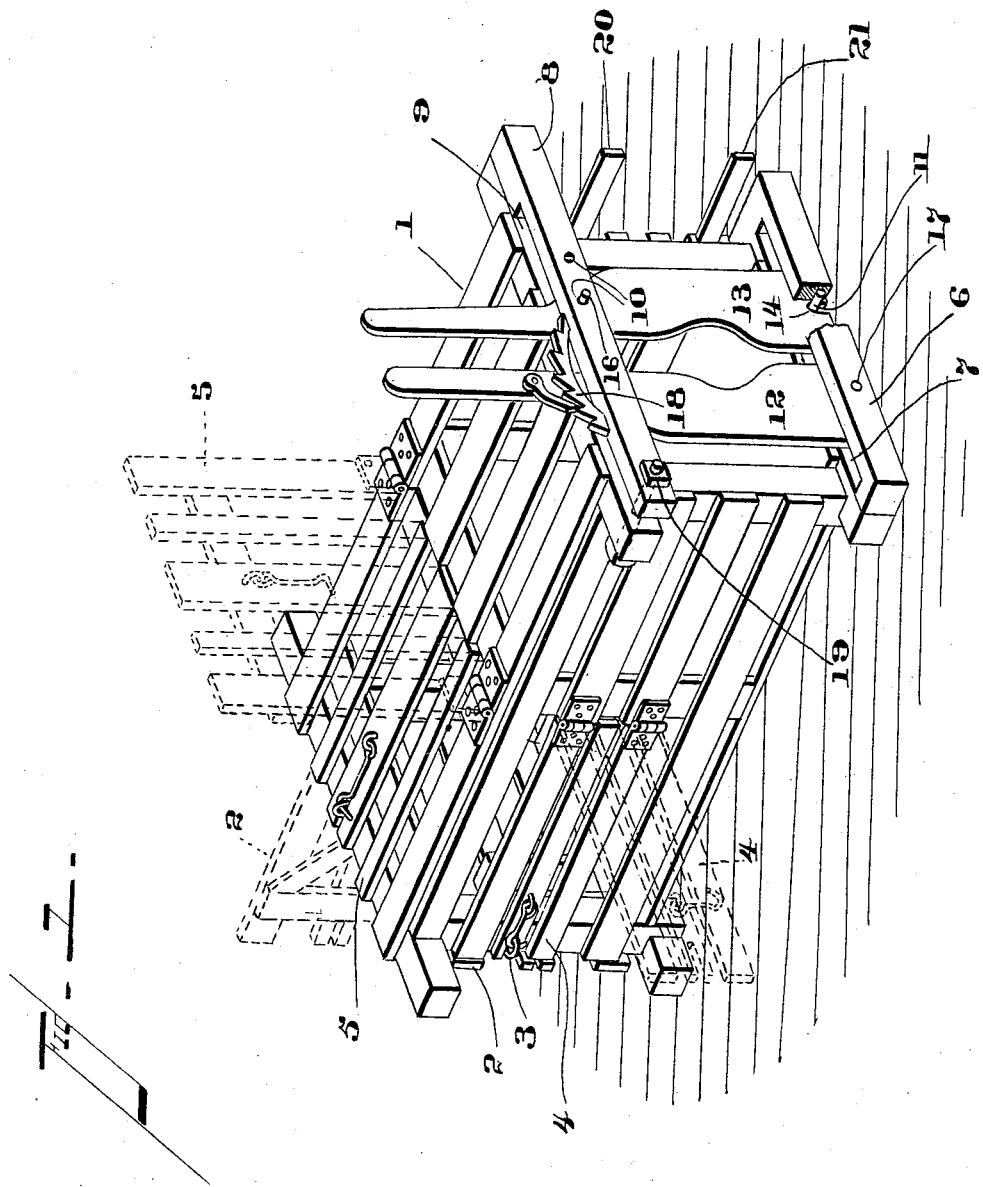
WITNESSES
Marcus L. Byng
A.W. Poynton
INVENTOR
John T. Geddis
By John Wedderburn
Attorney No. 616,309. Patented Dec. 20, 1898.
J. T. GEDDIS.
HOG TRAP.
(Application filed Mar. 25, 1897.)
(No Model.) 2 Sheets—Sheet 2.
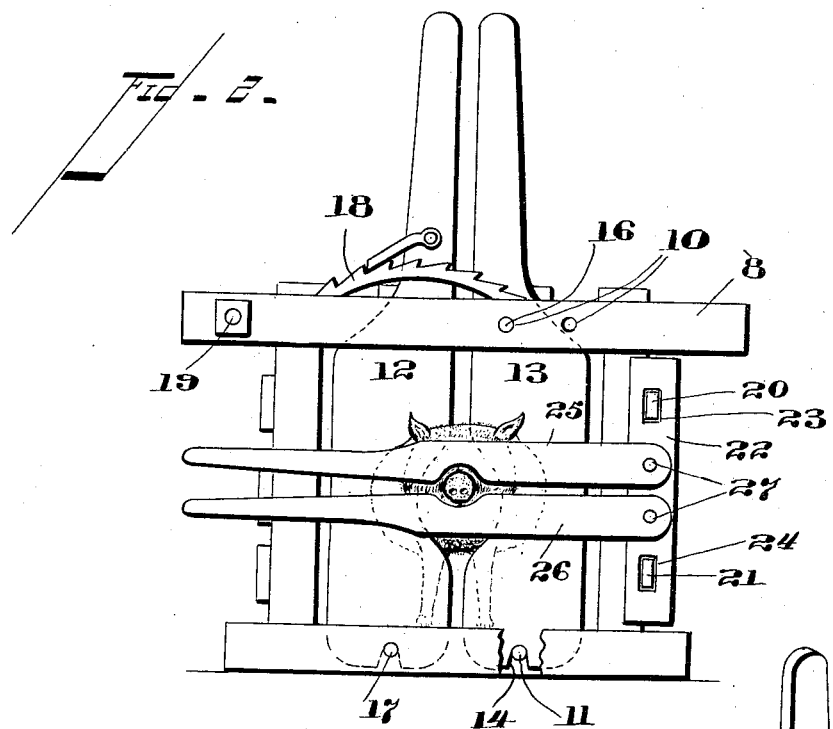
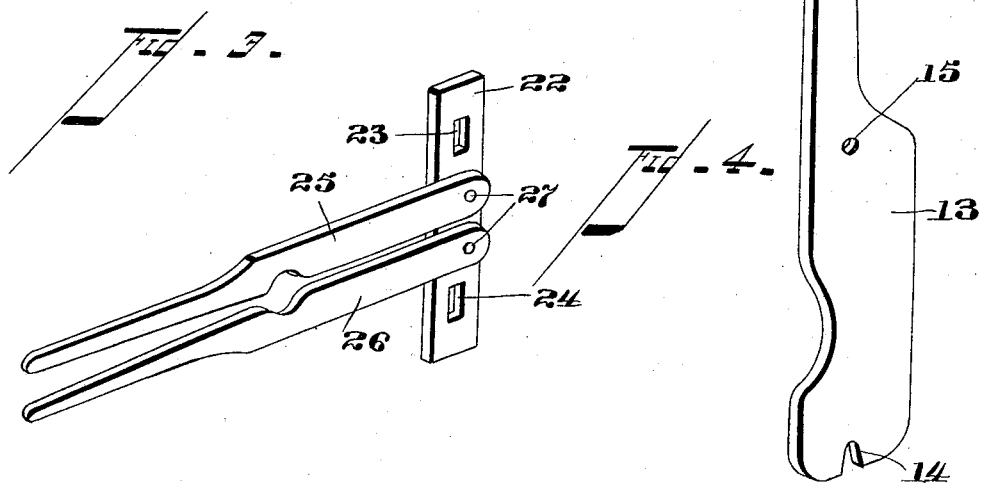
WITNESSES
Marcus L. Byng
Ann Poynton
INVENTOR
John T. Geddis
By John Wedderburn
Attorney

UNITED STATES PATENT OFFICE.

JOHN T. GEDDIS, OF IBERIA, OHIO.

HOG-TRAP.

SPECIFICATION forming part of Letters Patent No. 616,309, dated December 20, 1898.

Application filed March 25, 1897. Serial No. 629,141. (No model.)

*To all whom it may concern:*

Be it known that I, JOHN T. GEDDIS, of Iberia, in the county of Morrow and State of Ohio, have invented certain new and useful Improvements in Crates or Traps; and I do hereby declare the following to be a full, clear, and exact description of the invention, such as will enable others skilled in the art to which it appertains to make and use the same.

My invention relates to hog crates or traps.

My object is to provide a device of the class described which will have improved means for clamping or securing the head of the hog in proper position, so that ringing can be readily accomplished, and, further, to provide a novel device for holding the snout during the foregoing operation.

A further object is the provision of a hog-crate of improved construction whereby trimming of the hog can be more readily accomplished.

Having the foregoing objects in view, the invention consists of a hog crate or trap comprising certain improved features and novel combinations of parts, appearing more fully hereinafter.

In the accompanying drawings, Figure 1 is a perspective view of my improved device; Fig. 2, a front view showing the snout clamped in position; Fig. 3, a detail of a certain clamping device, and Fig. 4 a similar view showing the pivotal connection of one of the neck-clamp sections.

The numeral 1 designates the body of the crate or trap. At the rear of this crate there is a hinged door 2, closed by a hook-and-staple connection. There is a side door 4, locked by a similar device 3 to that just described, and there is also a top door 5, which is similarly locked, the two latter doors being hinged. At the front of the crate there is a bottom piece 6, which is provided with a slot 7. There is also an upper piece 8, having a slot 9, which is not a blind slot, as is the slot 7, but opens out at the end of the said top piece 8. In said top piece 8 there are openings 10.

The numeral 11 designates a pivot-pin which extends across the slot of the lower piece 6. The neck-clamp sections are shown at 12 and 13. The latter is provided with a slot 14 in its lower end, which receives the pin 11. This clamp-section has an aperture 15, and 16 is a pin which passes through one of the openings 10 and through said aperture, whereby the said clamp-section can be locked at any desired position, according to the size of the hog. The clamp-section 12 is pivoted to the lower member 6 on a pin 17. The numeral 18 designates ratchet mechanism for locking this clamp mechanism to the upper bar 8. At 19 there are shown a bolt and nut for closing the opening into the slot 9. When these are removed, the clamp-section 12 can be swung down, so that the hog can come out of the crate after ringing has been effected. When the hog is a large one, the pin can be removed from the clamp-section 13 and said section taken out. Two of the side slats of the crate are extended, as at 20 and 21.

My improved snout-clamp consists of a plate or bar 22, provided with openings 23 and 24 to receive the projecting ends 20 and 21, and two levers 25 and 26, which are suitably notched and are pivoted to the bar on bolts 27. By reason of this construction the snout-clamp is readily adjustable backward and forward on the projections 20 and 21 to accommodate and readily engage snouts of different lengths. The rear door is first opened and the animal driven in the crate. The clamp-section 12 is then adjusted up tightly against the animal's neck and the ratchet mechanism locks the said section. The levers 25 and 26 of the snout-clamp are then clamped around the snout, and the head of the animal can then be held perfectly still while ringing is being effected. Of course the snout-clamp need not be employed unless necessary, although it constitutes one of the material parts of the present device. I have heretofore described how the animal is released. When trimming large hogs, the rear door is left open after the animal has been secured, and the operation can then be readily accomplished. If desirable, the crate can be turned on its side and the top and side doors opened. Ample room is then given for the operation.

Having thus described the invention, what is claimed as new, and desired to be secured by Letters Patent, is—

1. In a hog crate or trap, the combination of a body or cage provided with projecting side slats, a bar movably and detachably connected with said slats, and nose-clamping levers pivoted to the bar whereby the nose-clamping levers may be adjusted back and forth, substantially as described.

2. In a hog crate or trap having projecting slats as described, the combination of a bar movably and detachably connected with said slats. a snout-clamp pivotally connected with the bar whereby the nose-clamping levers may be adjusted back and forth, and means for clamping the neck of the animal, substantially as described.

3. The combination of a hog crate or cage provided with projecting slats, pivoted neck-clamping members, locking mechanism for said members, and a snout-clamp comprising pivoted levers, and a bar adjustably and removably mounted on the projecting slats, substantially as described.

In testimony whereof I have signed this specification in the presence of two subscribing witnesses.

JOHN T. GEDDIS.

Witnesses:
MARTIN EVANS,
JOHN ARMSTRONG.